(12) United States Patent
Akiba

(10) Patent No.: US 9,609,854 B2
(45) Date of Patent: Apr. 4, 2017

(54) FISHING LINE GUIDE

(71) Applicant: Globeride, Inc., Tokyo (JP)

(72) Inventor: Masaru Akiba, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 36 days.

(21) Appl. No.: 14/486,329

(22) Filed: Sep. 15, 2014

(65) Prior Publication Data

US 2015/0089857 A1     Apr. 2, 2015

(30) Foreign Application Priority Data

Sep. 30, 2013   (JP) ................. 2013-203800

(51) Int. Cl.
  *A01K 87/04* (2006.01)
  *A01K 87/00* (2006.01)
  *A01K 99/00* (2006.01)
(52) U.S. Cl.
  CPC .............. *A01K 87/04* (2013.01); *A01K 87/00* (2013.01); *A01K 99/00* (2013.01)
(58) Field of Classification Search
  CPC ....... A01K 87/04; A01K 87/00; A01K 87/005
  USPC ........................................................ 43/24
  See application file for complete search history.

(56) References Cited

U.S. PATENT DOCUMENTS

| | | | | |
|---|---|---|---|---|
| 3,171,229 A | * | 3/1965 | Shobert ................. | A01K 87/04 43/24 |
| 3,400,481 A | * | 9/1968 | Christenson ........... | A01K 87/04 156/86 |
| 3,760,524 A | * | 9/1973 | Butler, Jr. ............. | A01K 87/04 156/165 |
| 3,769,735 A | * | 11/1973 | Cousin ................... | A01K 87/04 43/24 |
| 4,616,438 A | * | 10/1986 | Ohmura ................. | A01K 87/04 43/24 |
| 4,682,439 A | * | 7/1987 | Inoue ..................... | A01K 87/04 43/24 |

(Continued)

FOREIGN PATENT DOCUMENTS

| | | |
|---|---|---|
| CN | 102834000 | 12/2012 |
| JP | 10-210894 | 8/1998 |

(Continued)

OTHER PUBLICATIONS

European Search Report dated Feb. 27, 2015 for Appln. No. 14184725.1-1655.

(Continued)

*Primary Examiner* — Shin Kim
(74) *Attorney, Agent, or Firm* — Pillsbury Winthrop Shaw Pittman, LLP

(57) ABSTRACT

One object is to provide a lightweight fishing line guide that allows sharp sensing of fish bites. In accordance with one aspect, the line guide of the present invention includes a frame constituted by fiber-reinforced resin layers prepared by impregnating reinforcement fibers with a synthetic resin. The frame includes a ring retainer retaining a guide ring for admitting a fish line; a rod retainer having a retaining hole penetrating the frame and configured to be retained and fixed at a tip end of a tip rod of a fishing rod; and a support leg extending from the ring retainer and tipped with a fixation portion to be fixed on a rod.

9 Claims, 9 Drawing Sheets

(56) References Cited

U.S. PATENT DOCUMENTS

| | | | | |
|---|---|---|---|---|
| 5,181,336 | A * | 1/1993 | Yasui | A01K 87/04 43/24 |
| 5,361,529 | A * | 11/1994 | Lindler | A01K 87/04 43/24 |
| 5,855,084 | A * | 1/1999 | Huddleston | A01K 87/007 43/17 |
| 5,901,492 | A | 5/1999 | Ohmura | |
| 6,154,998 | A * | 12/2000 | Hashimoto | A01K 87/04 43/24 |
| 6,286,244 | B1 * | 9/2001 | Weiss | A01K 87/04 156/189 |
| 7,225,581 | B1 * | 6/2007 | Kirk | A01K 87/00 43/24 |
| 8,387,302 | B2 * | 3/2013 | Akiba | A01K 87/04 43/24 |
| 8,813,415 | B2 * | 8/2014 | Akiba | A01K 87/04 43/24 |
| 2006/0032108 | A1 * | 2/2006 | Roth | A01K 87/04 43/24 |
| 2006/0283073 | A1 * | 12/2006 | Omura | A01K 87/04 43/24 |
| 2010/0263257 | A1 * | 10/2010 | Akiba | A01K 87/04 43/24 |
| 2014/0250762 | A1 * | 9/2014 | Buchstein | A01K 87/04 43/24 |
| 2014/0360085 | A1 * | 12/2014 | Stender | A01K 87/04 43/18.1 CT |
| 2014/0373427 | A1 * | 12/2014 | Watanabe | A01K 87/04 43/24 |
| 2015/0089857 | A1 * | 4/2015 | Akiba | A01K 87/04 43/24 |
| 2015/0272096 | A1 * | 10/2015 | Yamamoto | A01K 87/06 43/22 |
| 2015/0296761 | A1 * | 10/2015 | Sugaya | A01K 99/00 43/24 |
| 2016/0057985 | A1 * | 3/2016 | Farrington | A01K 89/0155 43/4.5 |

FOREIGN PATENT DOCUMENTS

| | | |
|---|---|---|
| JP | 2000-316428 | 11/2000 |
| JP | 2010-193898 | 9/2010 |
| JP | 2011-223917 | 11/2011 |
| JP | 2011-239777 | 12/2011 |
| JP | 2012-070666 | 4/2012 |

OTHER PUBLICATIONS

Taiwanese Office Action dated Dec. 14, 2015 for Appln. No. 103132580.

Chinese Office Action dated Mar. 9, 2016 for Appln. No. 201410495807.7.

Chinese Office Action dated Aug. 22, 2016 for Appln. No. 201410495807.7.

Japanese Office Action dated Sep. 1, 2016 for Appln. No. 2013-203800.

* cited by examiner

FISHING LINE GUIDE

CROSS-REFERENCE TO RELATED APPLICATIONS

This application is based on and claims the benefit of priority from Japanese Patent Application Serial No. 2013-203800 (filed on Sep. 30, 2013), the contents of which are hereby incorporated by reference in their entirety.

TECHNICAL FIELD

The present disclosure relates to a fishing line guide mounted on a fishing rod for guiding a fishing line and in particular, to improvement of a top guide attached to the tip end of a tip rod of the fishing rod.

BACKGROUND

A conventional fishing line guide mounted on a fishing rod for guiding a line includes a frame mounted on an outer surface of the rod directly or via a support leg, and a guide ring secured on the frame. A fishing line is admitted through the guide ring. The fishing line guide mounted at the tip end of a tip rod is referred to as a top guide. Such a top guide has a rod insertion pipe projected from the frame and into which the tip end of the tip rod is inserted. The top guide is attached to the fishing rod via its rod insertion pipe by, for example, bonding (see, for example, Japanese Patent Application Publication No. Hei 10-210894 (the "'894 Publication")).

Conventional top guides such as disclosed in '894 Publication have a substantial weight due to the rod insertion pipe extending from the frame. Such a rod insertion pipe makes it difficult to reduce the weight of the top guide. Moreover, since the fishing rod and the frame are indirectly connected to each other via the rod insertion pipe, fish bites might be sensed less sharply at the butt end of the fishing rod.

The present disclosure is intended to overcome the above problems. One object of the present disclosure is to provide a lightweight fishing line guide that allows sharp sensing of fish bites.

SUMMARY

To the above end, the present invention provides a fishing line guide having a frame constituted by fiber-reinforced resin layers made of reinforcement fibers impregnated with a synthetic resin, the frame comprising: a ring retainer retaining a guide ring for admitting a fish line; a rod retainer having a retaining hole penetrating the frame and configured to be retained and fixed at a tip end of a tip rod of a fishing rod; and a support leg extending from the ring retainer and tipped with a fixation portion to be fixed on the tip rod.

In the above fishing line guide, the frame is retained and fixed directly on the tip end of the tip rod via the retaining hole of the frame, instead of being retained and fixed indirectly on the tip end of the tip rod via a rod insertion pipe extending from the frame. That is, since the above fishing line guide is free of conventional rod insertion pipes, the weight of the entire fishing line guide can be significantly reduced. Additionally, since the frame of the fishing line guide is directly connected to the fishing rod without the medium of a rod insertion pipe, fish bites can be sensed much more sharply at a bottom portion of the fishing rod.

Further, in the above fishing line guide, the frame is formed of a fiber-reinforced resin, which enables weight reduction and improvement in bending properties. Fishing rods having such a fishing line guide can exert intended properties thereof. The fiber-reinforced resin layer should preferably be continuous from at least a part of the ring retainer to at least a part of the support leg. Thus, the fishing line guide can have a high strength.

The present invention provides a lightweight fishing line guide that allows sharp sensing of fish bites.

DESCRIPTION OF EXAMPLE EMBODIMENTS

Embodiments of a fishing line guide according to the invention and methods of manufacturing the same are hereinafter described with reference to the drawings.

Figure 1:
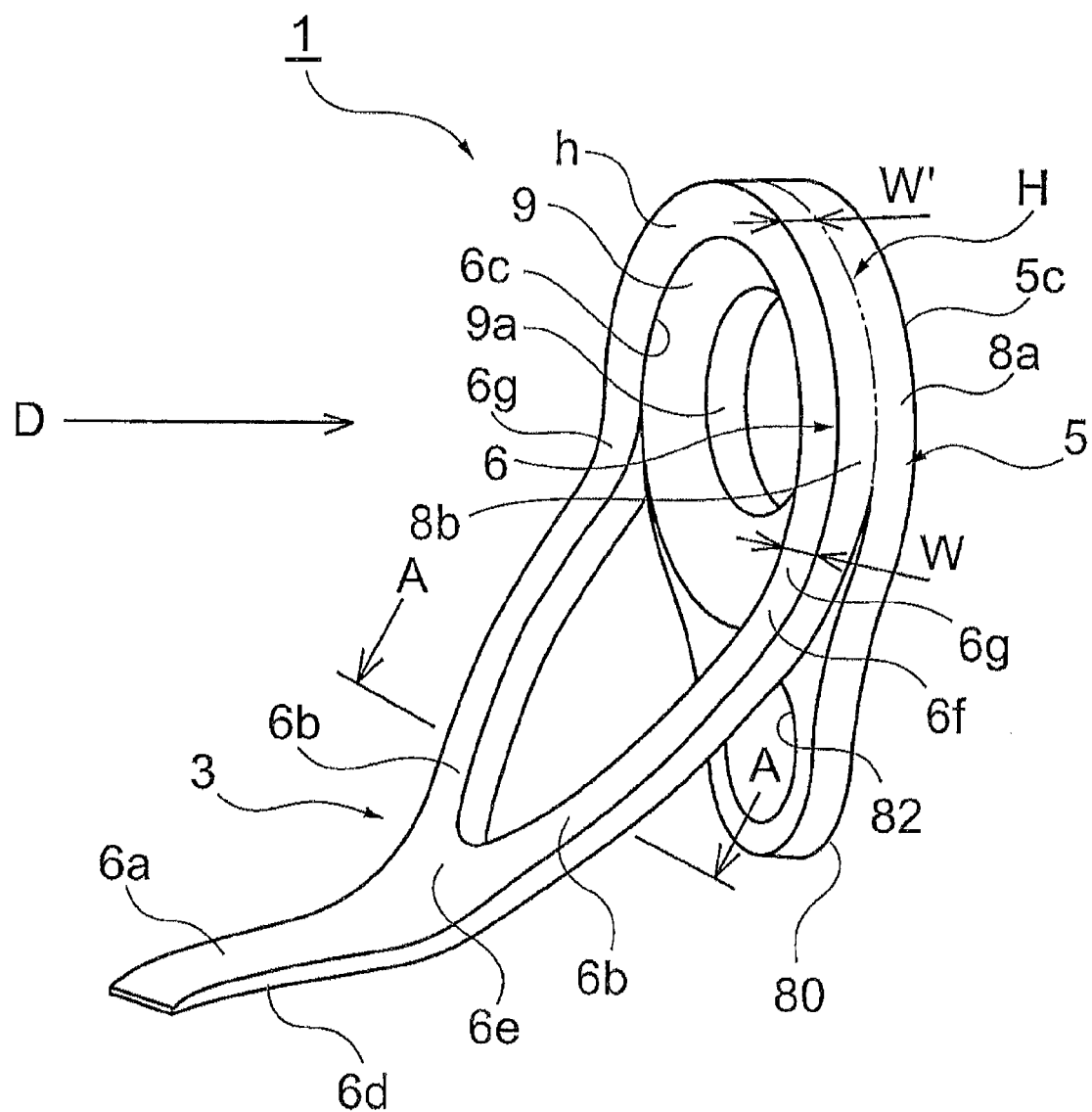
FIG. 1 is a perspective view of a fishing line guide according to an embodiment of the invention.
Figure 2:
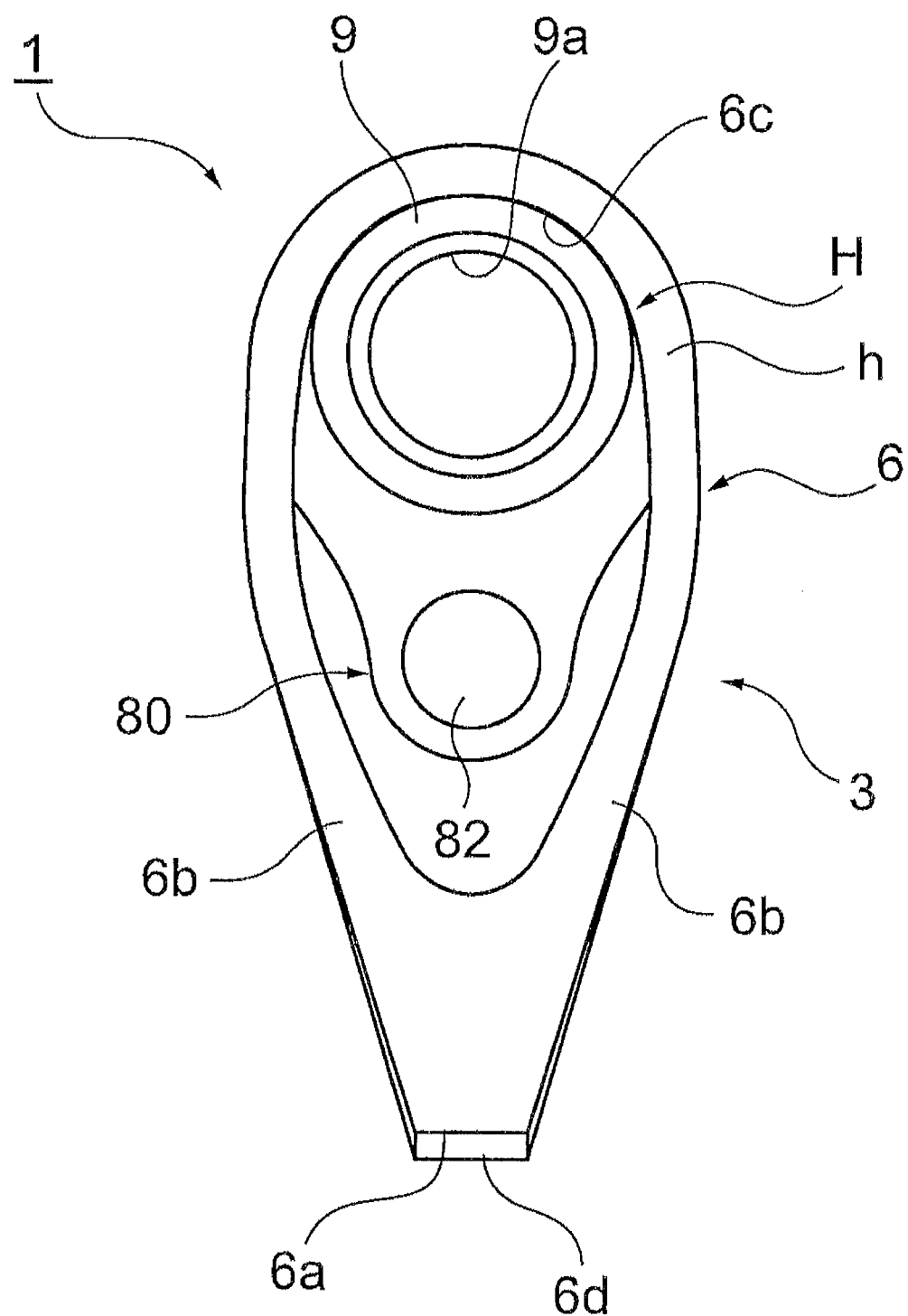
FIG. 2 is an elevation view of the fishing line guide of FIG. 1 as viewed from behind.
Figure 3:
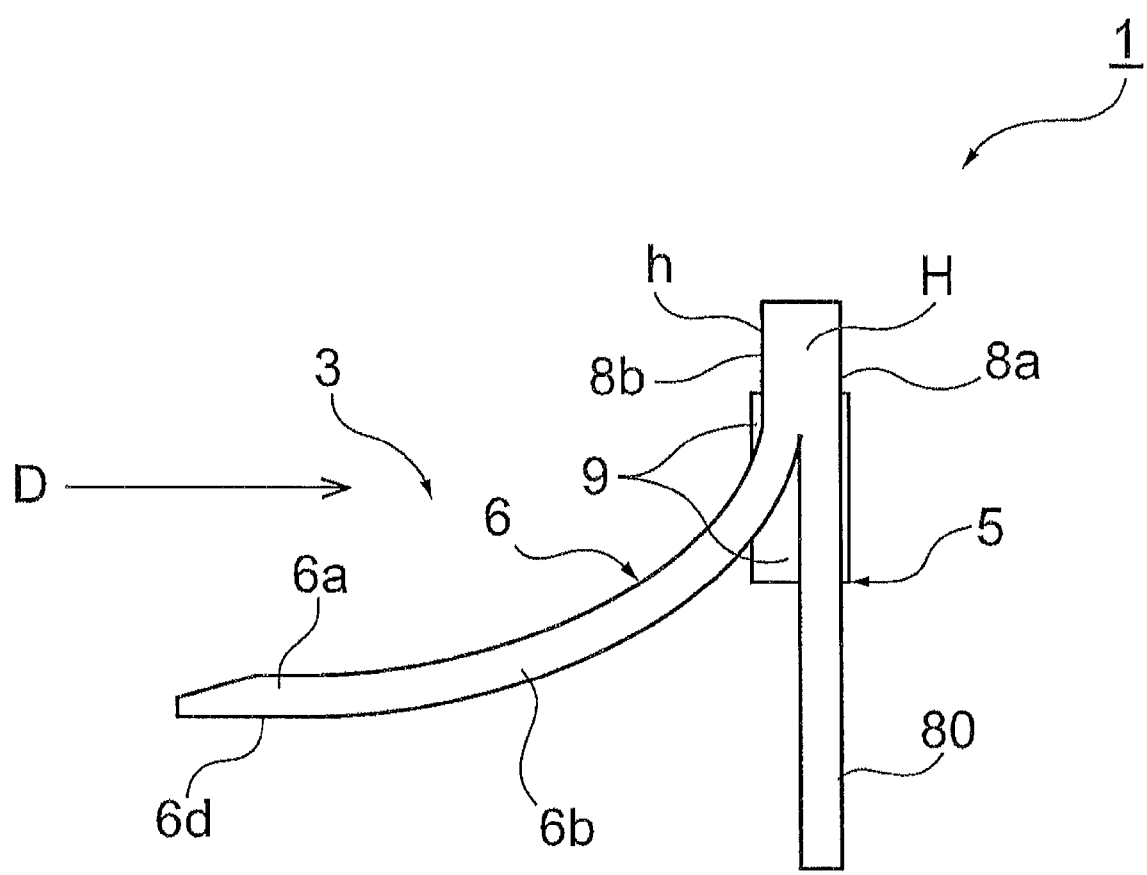
FIG. 3 is a side view of the fishing line guide of FIG. 1.
Figure 4:
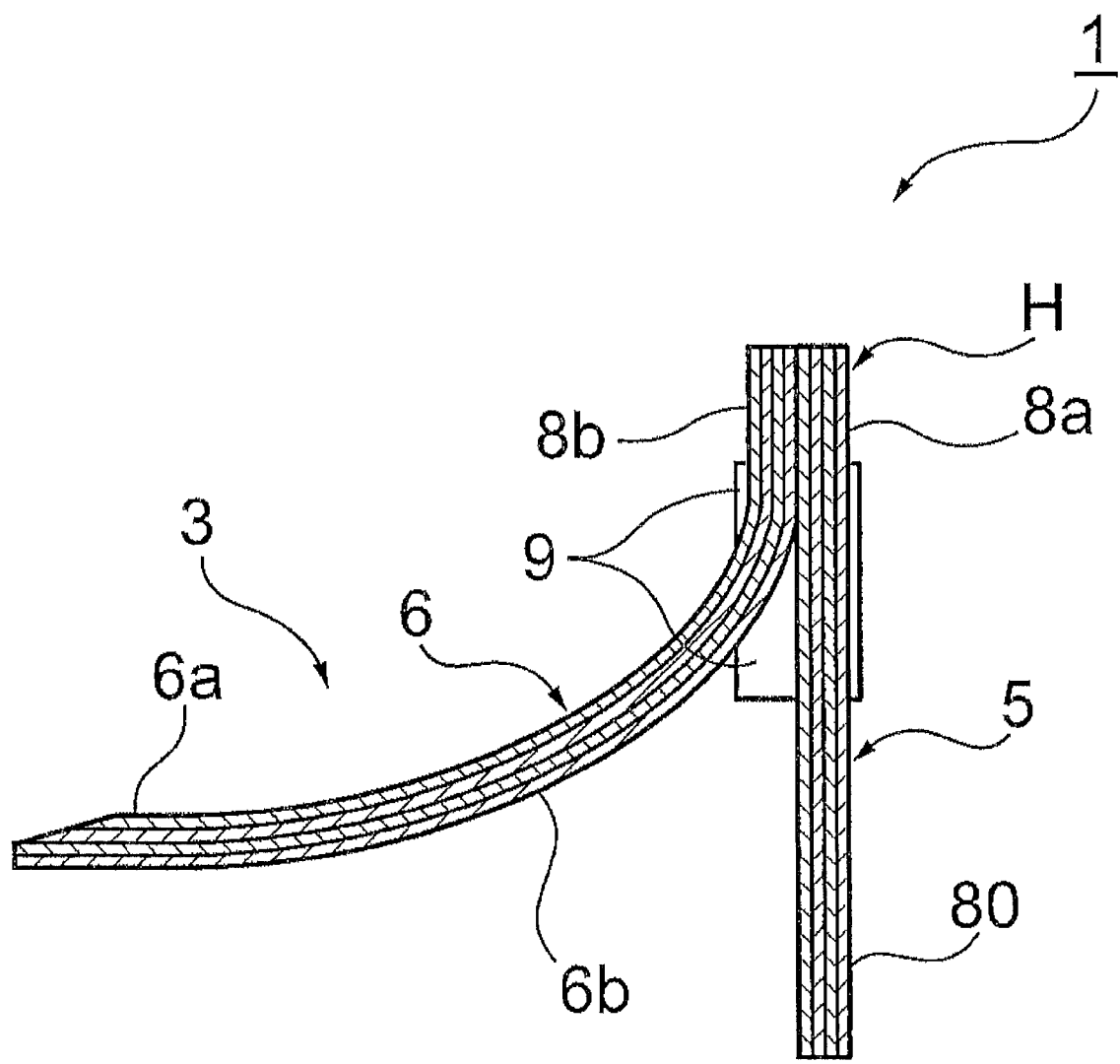
FIG. 4 is a longitudinal sectional view of the fishing line guide of FIG. 1 along the frame.
Figure 5:
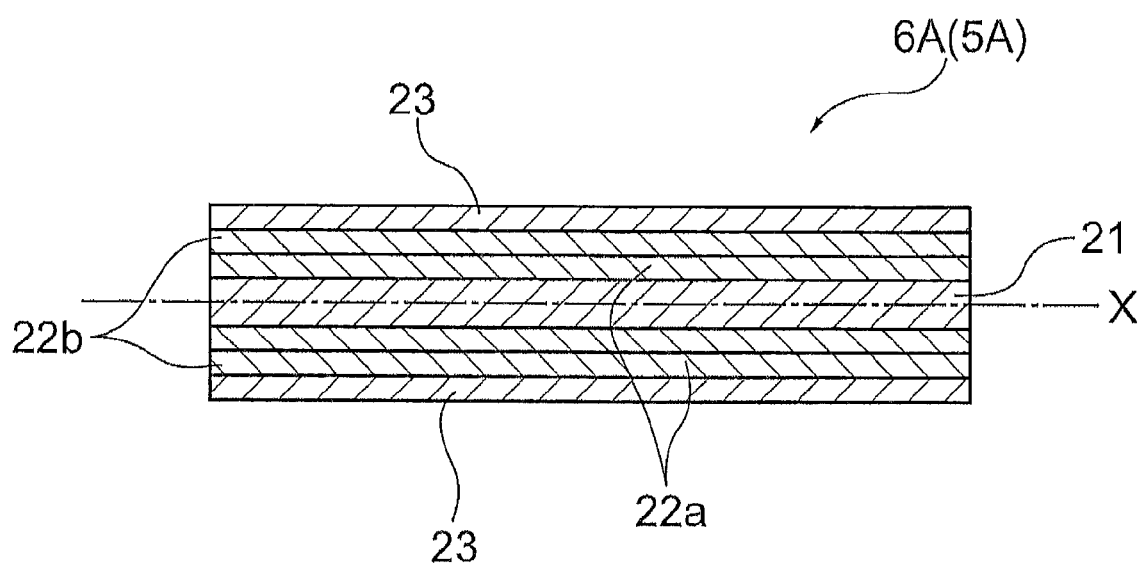
FIG. 5 is a sectional view along the A-A line in FIG. 1.

First, an embodiment of a fishing line guide according to the invention is hereinafter described with reference to FIGS. 1 to 5. FIG. 1 is a perspective view of the line guide, FIG. 2 is an elevation view of the line guide as viewed from behind, FIG. 3 is a side view of the line guide, FIG. 4 is a longitudinal sectional view of the line guide along the frame, and FIG. 5 is a sectional view along the A-A line in FIG. 1. The arrow D in FIGS. 1 and 3 indicates the direction of viewing the line guide mounted on the tip rod of the fishing rod from the base rod, which corresponds to the lengthwise direction of the fishing rod. Hereinafter, the term "front" points toward the rod tip, while the term "rear" points toward the proximal end (base rod).

The line guide 1 may include a frame 3 formed of a laminated material of fiber-reinforced resin layers prepared by impregnating reinforcement fibers with a synthetic resin. The "fiber-reinforced resin layers" may be sheet-like prepregs stacked together, or tape-like or thread-like prepregs stacked or bundled together, or combination thereof. The thickness, width, and sectional configuration of each layer may be desirably varied depending on the shapes of the portions of the line guide 1. Such a frame 3 may be manufactured by a desired method. For example, a frame 3 may be cut out into a frame shape from a tabularly shaped fiber-reinforced prepreg as will be described later; alternatively, a fiber-reinforced resin may be placed into a space in a mold for forming a line guide to mold the line guide 1 (in this case, cutting operation is unnecessary). For the embodiment, it is supposed for convenience that the frame 3 is formed of a laminated material including a plurality of fiber-reinforced resin layers, i.e., fiber-reinforced prepregs (hereinafter referred to as "prepregs") stacked together in a front-rear direction, wherein the fiber-reinforced prepregs are prepared by impregnating reinforcement fibers with a synthetic resin (the configuration and stacking mode of the prepregs and details of the method of manufacturing a frame will be described later).

The frame 3 may be constituted by a front fiber-reinforced resin layer 5 and a rear fiber-reinforced resin layer 6, each of which includes a plurality of prepregs stacked together and pressed with a die, each of the prepregs constituting a fiber-reinforced resin layer. The front fiber-reinforced resin layer 5 and the rear fiber-reinforced resin layer 6 may be tabularly shaped with a width in the left-right direction greater than the thickness of the contacting portions 8 (8*a*, 8*b*) (described later) in the axial direction (the direction of the arrow D in FIG. 1, or the front-rear direction).

In the embodiment, the front fiber-reinforced resin layer 5 may include a contacting portion 8*a* having a substantially annular shape and positioned above and a rod retainer 80 having a retaining hole 82 and adapted to be secured to the tip rod of the fishing rod not shown through adhesion, etc. In the embodiment, depending on the outer diameter of the tip rod on which the line guide 1 is to be mounted, the left-right width of the rod retainer 80 may be smaller than that of the contacting portion 8*a*, and the rod retainer 80 and the contacting portion 8*a* may be substantially flush with each other. The retaining hole 82 may be formed, e.g., by piercing the frame 3 after the frame 3 is formed as described later.

The rear fiber-reinforced resin layer 6 may include a contacting portion 8*b* having a substantially semiannular shape, which is positioned above and contacts the contacting portion 8*a*, a pair of support legs 6*b* extending from the contacting portion 8*b* in a direction substantially orthogonal to the direction of the arrow D and obliquely diverging from the fiber-reinforced resin layer 5, and a rod fixation portion 6*a* positioned below and continuous to both the support legs 6*b* and extending rearward in a bent shape.

In the line guide 1 of the embodiment, the contacting portion 8*a* of the front fiber-reinforced resin layer 5 may face the contacting portion 8*b* of the rear fiber-reinforced resin layer 6. These contacting portions 8*a*, 8*b* may constitute the ring retainer H, on which a guide ring 9 for admitting a fishing line may be provided. The support legs 6*b* may be projected from the substantial vertical middle point of the back surface h of the ring retainer H at the same width as the width W of the back surface h. That is, in the embodiment, the left right width W of the ring retainer H may be greater than the front-rear thickness W' of the same; and under such a condition, the diverging portions 6*g* of the support legs 6*b* (diverging from the ring retainer H) may be projected from the back surface h of the ring retainer H. That is, the diverging portions 6*g* may be projected from the back surface h or the side surface of the ring retainer H, depending on which of the left-right width and the front-rear thickness of the ring retainer H is larger. Accordingly, if the left right width W of the ring retainer H is smaller than the front-rear thickness W' of the same (conversely to the embodiment), the diverging portions 6*g* may be projected from the side surface of the ring retainer H.

The diverging portions 6*g* may be thus projected from the back surface h of the ring retainer H. Therefore, the reinforcement fibers may be in a stable orientation, and the diverging portions 6*g* may have improved strength and stability. Further, the reinforcement fibers may have appropriate left-right width which results in a small size and a reduced weight. Such configuration may also prevent snagging of a line. The diverging portions 6*g* of the support legs 6*b* may thus be projected from the back surface h or the side surface of the ring retainer H, depending at least on which of the left-right width and the front-rear thickness of the ring retainer H is larger; therefore, the ring retainer H and the support legs 6*b* can be integrated at larger regions, resulting in improved strength, a smaller size, and a reduced weight. In the embodiment, the support legs 6*b* may be projected from the back surface h of the ring retainer H with the same width as the width W of the back surface h; but the support legs 6*b* may be required to have the same width as the width W of the back surface h only at the diverging portions 6*g*; and between the diverging portions 6*g* and the fixation portion 6*a*, the support legs 6*b* may have either a larger or smaller width than the diverging portions or may be adjusted in orientation.

In the embodiment, the contacting portions 8*a*, 8*b* may be provided with openings (through holes) 5*c*, 6*c*, respectively, for retaining the guide ring 9. These openings 5*c*, 6*c* may be formed by cutting operation after the upper regions of the front fiber-reinforced resin layer 5 and the rear fiber-reinforced resin layer 6 mutually facing are integrated with each other.

The rod fixation portion 6*a* (also referred to as "foot") may be fixed on the surface (the upper surface or the lower surface; the embodiment adopts the upper surface) of a rod (the tip rod) and may be a tabular strip extending rearward of the line guide 1. The contacting surface 6*d* in the bottom of the rod fixation portion 6*a* may be placed on the surface of the rod (the tip rod) along the longitudinal direction of the rod; and the rod fixation portion 6*a* may be fixed by, e.g., winding a thread and then applying an adhesive thereon. The fixation portion 6*a* may have various shapes.

The openings 5*c*, 6*c* formed in the contacting portions 8*a*, 8*b* may have the same shape and may have a substantially circular outer shape as a whole. The guide ring 9 fitted into these openings 5*c*, 6*c* may have a shape of a ring and may be formed of, e.g., titanium, aluminum, SUS, ceramic, so as to have a small sliding resistance at the line guiding surface 9*a* (inner circumferential surface) thereof. After the frame 3 is integrally formed of the prepregs, the guide ring 9 may be fitted and fixed into the openings 5*c*, 6*c* formed in the contacting portions 8*a*, 8*b*.

The front fiber-reinforced resin layer 5 and the rear fiber-reinforced resin layer 6 should preferably have one or more bending portions. In the embodiment, each of the support legs 6*b* in the rear fiber-reinforced resin layer 6 may have a first bending portion 6*e* and a second bending portion 6*f* which is bent more slackly than the first bending portion 6*e*, at the border region with the rod fixation portion 6*a* and the border region with the contacting portion 8*b* (from which the support legs are projected), respectively.

Due to the second bending portion 6*f* which is slackly bending, the frame 3 as a whole having the bending portions 6*e*, 6*f* can have stepwise bending angles, thereby dispersing the stress and improving the strength. In particular, it may be preferable that, in the frame 3 having a plurality of bending portions, the bending angle (an angle between tangents to both sides of a bending portion) should be smaller at the bending portion in or near the border region between the rod fixation portion 6*a* and the support legs 6*b* (corresponding to the first bending portion 6*e* in the figure) than at the bending portion adjacent to the contacting portion 8*b* (corresponding to the second bending portion 6*f* in the figure).

Since the bending angle is smaller at the bending portion adjacent to the contacting portion 8b, the stress imparted when, e.g., the line is snagged may be dispersed, resulting in stable strength.

The support legs 6b, which may be straight between the two bending portions as shown in the figure, may also be partially or entirely curved with a curved surface.

The bending portions 6e, 6f formed in the frame 3, which may tend to break due to focused stresses, may be improved in specific strength and specific rigidity by use of a manufacturing method and prepregs described later. The bending portions may be provided with reinforcement layers so as to prevent damage under load of a line. When the line guide is mounted on a rod, the reinforcement layers may increase the bending rigidity of the frame 3 in the front-rear direction so as to reduce a change in bending angle when the bending portions are bent under a load. The reinforcement layer may be formed of some of the plurality of prepregs constituting a laminated fiber-reinforced resin layer, and these prepregs may include reinforcement fibers extending along the direction of rising up from the rod.

More specifically, as shown in FIG. 5, the plurality of prepregs may include, e.g., a lengthwise fiber resin layer 21 in which reinforcement fibers may extend along the direction of rising up from the rod (the lengthwise direction of the rod), angled fiber resin layers 22a, 22b in which reinforcement fibers may extend along the direction angled with respect to the lengthwise direction of the rod, and fabric layers 23 including woven reinforcement fibers. The fibers of the fiber-reinforced resin (fiber-reinforced resin layers) may be continuous from at least part of the ring retainer H to at least part of the support legs 6b. In the embodiment as clearly shown in FIG. 4, the fibers of the rear fiber-reinforced resin layer 6 (and the fiber-reinforced resin layer 6 itself) may extend continuously from the rod fixation portion 6a to the contacting portion 8b (over the entire length); and the fibers of the front fiber-reinforced resin layer 5 (and the fiber-reinforced resin layer 5 itself) may also extend continuously over the entire length. FIG. 5 shows a laminated structure of the rear fiber-reinforced resin layer 6 (laminated material 6A) composed of prepregs. The front fiber-reinforced resin layer 5 (laminated material 5A) may also have the same laminated structure. The seven-layer structure in FIG. 5 is simplified into a four-layer structure in FIGS. 4 and 6.

The embodiment may include a lengthwise fiber resin layer 21 formed of a prepreg in which reinforcement fibers extend in a lengthwise direction in a neutral axis area (the neutral axis is indicated by X in FIG. 5) positioned at middle of the thickness of the frame 3, angled fiber resin layers 22a, 22b on the outside (both sides) of the lengthwise fiber resin layer 21, formed of prepregs in which reinforcement fibers extend in a direction angled by a predetermined angle (a desired angle which should preferably be 15 to 75° and more preferably be 30 to 60°) with respect to the lengthwise direction, and fabric layers 23 as the outermost layers (entirely or partially being the outermost) formed of prepregs in which reinforcement fibers may be woven. The lengthwise fiber resin layer 21 may include a plurality of layers (one to four layers). Further, each of the angled fiber resin layers 22a, 22b may have reinforcement fibers oriented differently.

Thus, the line guide 1 made of fiber-reinforced resin should preferably be formed by stacking prepregs such that reinforcement fibers are oriented in at least three directions in a front view or a planar view of the frame. That is, with reinforcement fibers oriented in three or more directions, the line guide can be efficiently formed to have a light weight and high strength. Also, as in the above arrangement, the lengthwise fiber resin layer 21 disposed in the middle layer region of the frame 3 may efficiently increase the specific rigidity of the frame 3, as well as reduce the weight, so as to endure bending force in the lengthwise direction produced by tension of the line.

Further, as in the above described arrangement of prepregs, it may be preferable that fabric layers 23 should be disposed at the outermost layer of the frame 3. The surface of the frame 3 tends to be rubbed and abraded by other objects and, in actual fishing, the reinforcement fibers tend to be removed from or broken at edges of the frame due to bending the frame caused by tension of the line. Therefore, the fabric layer having reinforcement fibers woven on the surface region of the frame may effectively prevent removal or break of reinforcement fibers and improve the strength and stability.

The fabric layer 23 may surely prevent removal or break of reinforcement fibers and improve the strength and stability. The bending portions 6e, 6f can also be relatively reinforced to achieve a lightweight line guide having a well-balanced strength. The width of the meshes of the fabric layer 23 in the rod fixation portion 6a and the contacting portions 8a, 8b should preferably be smaller than the minimum widths of these portions.

Next, the method of forming the above frame 3 will be hereinafter described with reference to FIGS. 6 and 7.

The frame 3 may be formed of a plurality of prepregs (laminated material) 5A constituting the front fiber-reinforced resin layer 5 having the laminated structure as shown in FIG. 5 and a plurality of prepregs (laminated material) 6A constituting the rear fiber-reinforced resin layer 6. As described above, the prepregs constituting the layers may be formed into a sheet wherein reinforcement fibers such as carbon fibers or glass fibers extend in a predetermined direction or are woven; and the sheet may be impregnated with a heat-curable resin (e.g., epoxy resin) or a thermoplastic resin (e.g., nylon) as a matrix resin. The frame 3, which is constituted by a plurality of fiber-reinforced resin layers, may include a reinforcement layer for reinforcing the bending portions described above.

First, the above prepregs may be cut into a predetermined shape and stacked together to form a plurality of layers. The number of prepregs stacked together (the number of layers) and the configuration of each of the prepregs are not particularly limited. The types of the prepregs and the conditions of stacking the prepregs may be desirably adjusted in consideration of forming of bending portions 6e, 6f in the frame 3, loads imparted on the frame 3 in use, and the properties of the rods on which the frame is mounted and location of mounting.

Figure 6:
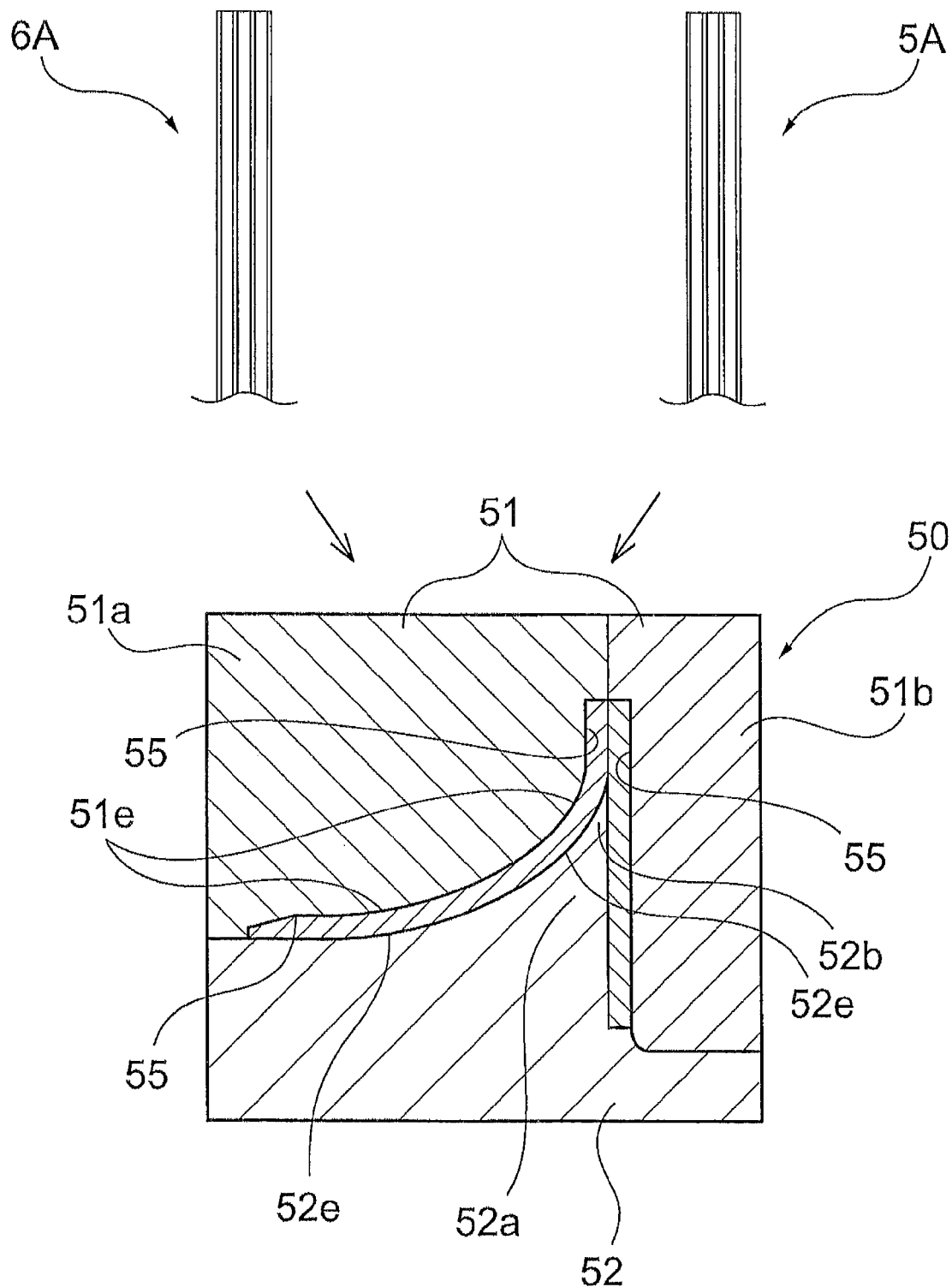
FIG. 6 is a sectional view showing an exemplary configuration of a die for forming a frame included in the fishing line guide of FIG. 1 (with laminated prepreg sheets placed therein).
Figure 7:
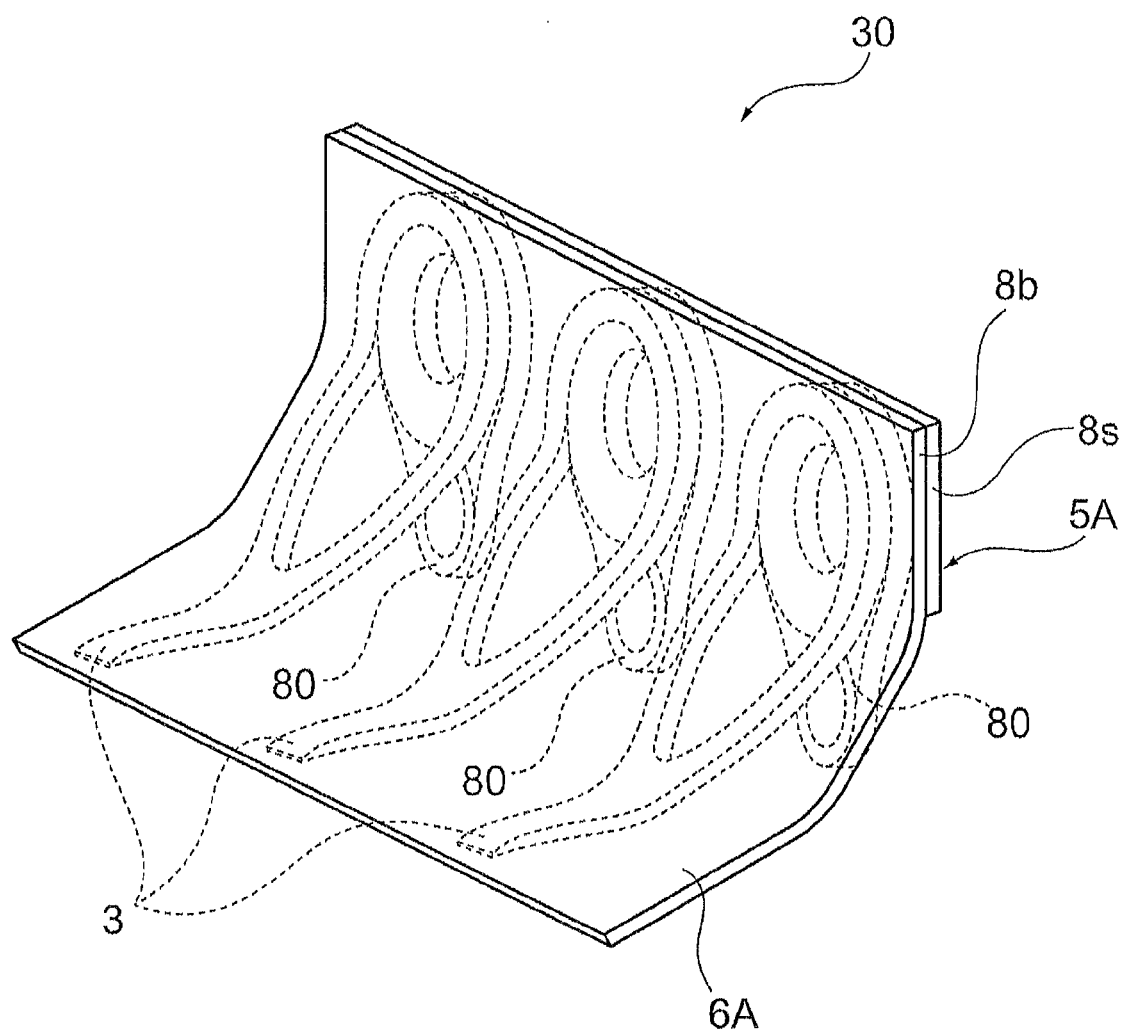
FIG. 7 is a perspective view showing frames to be cut out from a tabular body formed with the die of FIG. 6.

The laminated materials 5A, 6A laminated with a plurality of layers may be set into a die 50 shown in FIG. 6. The die 50 of the embodiment may include an upper die 51 and a lower die (bottom die) 52 vertically parted; and the upper die 51 may include a left die (front die) 51a and a right die (rear die) 51b horizontally parted. The lower die 52 may include a protrusion 52a with a substantially triangle section having a curved slope in one end surface and a vertical surface in the other end surface. The left die 51a and the right die 51b can be horizontally separated at the peak 52b of the protrusion 52a. The die 50 may allow opening the three-directional dies (the bottom die 52, front die 51a, and the rear die 51b) and closing the dies to a shape-forming state. Therefore, the die 50 may have any desired structure as long as it can be opened at predetermined portions in three or more directions using, e.g., pins or tops. The movement and structure of the pins or tops for opening and closing the dies in three or more directions may be desirably set.

The method of setting the laminated materials 5A, 6A into the die is not particularly limited. For example, the regions upside of the peak 52b of the protrusion 52a may be set so as to face with each other (portions of the two laminated materials are faced and contacted with each other); and below these regions the two laminated materials may be set along the protrusion 52a of the lower die 52, forming noncontacting portions including the rod fixation portion. Layers of Each of the laminated materials 5A, 6A may be either set at once or set one by one for plurality of times. Separately setting the layers for a plurality of times may reduce the movement of the reinforcement fibers and increase the accuracy in positioning. Between the left and right dies 51a, 51b of the upper die 51 and the lower die 52 may be provided a hollow portion 55 corresponding to the position to which the laminated materials 5A, 6A are to be set, and the surface region of the hollow portion 55 may be coated with a release agent.

The size of the hollow portion 55 may correspond to the thickness of the frame 3. The lower die 52 may be provided with bend-forming recesses 52e at positions corresponding to the bending portions 6e, 6f. The left die 51a may be provided with a bend-forming projection 51e at a position corresponding to the bend-forming recess 52e. The hollow portion 55 may be formed such that the rod fixation portion 6a may be formed between the lower die 52 and the left die 51a.

The above described die is a mere example. The die can be desirably parted in, e.g., a left-right direction or angled direction.

As descried above, the laminated materials 5A, 6A may be set to predetermined positions on the lower die 52 and then pressed, and the dies are fixed. Such pressing and fixation may be achieved by either squeezing with the upper die 51 or urging with hands or pressing tools. Thus, the shape corresponding to the complete frame shape including the bending portions may be formed. This may prevent occurrence of internal residual stress after forming of the shape, resulting in improved strength and stability (in this stage, each of the prepregs may remain in an uncured state (including tentatively cured state), and the bending portions are to be formed before heat hardening).

Then, the work is subjected to heat process wherein the matrix resin is cured; and the shaped work (a tabular body 30 having bending portions) may be taken out from the die 50. The tabular body 30 may be formed as shown in FIG. 7, wherein the front fiber-reinforced resin layer and the rear fiber-reinforced resin layer may be integrated at the region of the contacting portions 8a, 8b. In FIG. 1, the portion representing the middle portion of the two fiber-reinforced resin layers is drawn with a two-dot chain line.

In the heat hardening wherein the bending portions are pressed by the die 50, the bending portions should preferably be pressed harder than the adjoining regions. Pressing the bending portions harder may prevent voids in the bending portions 6e, 6f of the formed frame, resulting in improved strength and stability. Also, this may provide a higher fiber density to the bending portions 6e, 6f of the formed frame 3 than to the adjoining regions (the fixation portion and the support legs), thereby strengthening the bending portions susceptible to break. The bending portions 6e, 6f should preferably have a higher fiber density than the adjoining regions. For example, as described above, a higher pressure on the bending portions in heat hardening may cause the resin to flow out and increase the fiber-density in the bending portions, thus making the line guide less susceptible to break during bending of the frame under a load.

Next, a frame 3 may be cut out from the tabular body to a predetermined shape. As described above, the prepreg may be formed into a tabular body including bending portions formed after heat hardening. Therefore, as shown in FIG. 7, a plurality of frames 3 can be cut out from one tabular body 30 by a desired method such as cutting by press working, cutting by a liquid (e.g., water jet), cutting by cutting tools (e.g., end mill), or cutting for removing or fracturing unnecessary portions. A line guide having a reduced weight and a high strength can thus be manufactured efficiently.

In this processing, the basic outer shape of the frame 3, i.e., the contacting portions 8a, 8b having the openings 5c, 6c, the support legs 6b and the rod fixation portion 6a, and the retaining hole 82 should preferably formed at the same time; alternatively, these portions may be formed in different steps. The tabular body 30 is not limited to one simple planar body, but may also have different lamination thickness at different portions, have a shape wherein tabular portions extend in multiple directions (e.g., T-shape or inverted Y-shape), include a curved surface, or have an opening for weight reduction.

Next, the tabular body 30 may be subjected to detail processing. The detail processing may include, e.g., curving the rod fixation portion 6a for better placement on the rod or grinding an edge of the fixation portion for facilitating winding of a thread for fixation.

Next, the frame 3 may be subjected to surface treatment. For example, the frame 3 may be subjected to barrelling for removing the burr on the surface and then to final polishing so as to obtain surface luster. The polishing agent and the polishing time can be desirably adjusted depending on the size, shape, and substance of the line guide 1. Such barrelling enables polishing of the frame 3 without damaging the reinforcement fibers, resulting in stable strength and excellent appearance of the line guide.

The frame 3 should preferably polished such that the reinforcement fiber is partially exposed in the surface of the frame 3 and the matrix resin partially remains. Thus, the luster of the polished surface may be further improved. The side surfaces of the frame 3 may be polished such that a plurality of fiber-reinforced resin layers are flush with each other.

Next, the entirety or a part of the frame 3 may be coated with a film, as necessary. For example, coating may be applied or metal or ceramic may be deposited for improved appearance or protection of the frame body.

The guide ring 9 may be mounted on the portion of the frame defining the openings 5c, 6c. The guide ring 9 may be mounted by a desired fixing method such as press fit, adhesion, curling, etc.

In the fishing line guide 1 of the embodiment as described above, the frame 3 is retained and fixed directly on the tip end of the tip rod via the retaining hole 82 of the frame, instead of being retained and fixed indirectly on the tip end of the tip rod via a rod insertion pipe extending from the frame. That is, since the fishing line guide 1 of the embodiment is free of conventional rod insertion pipes, the weight of the entire fishing line guide 1 can be significantly reduced. Additionally, since the frame 3 of the fishing line guide 1 is directly connected to the fishing rod without the medium of a rod insertion pipe, fish bites can be sensed much more sharply at a bottom portion of the fishing rod.

The line guide 1 formed by the above manufacturing method may be formed of fiber-reinforced resin layers made of reinforcement fibers impregnated with a synthetic resin. Therefore, the line guide 1 has a reduced weight and excellent specific strength, specific rigidity, and bending properties, as compared to metal line guides. In particular, the reduced weight of the line guides on a tip rod may enable sensing of slight fish bites, resulting in improved performance of the fishing rod. Further, the fiber-reinforced resin layers (and the fibers constituting these layers) may be continuous from at least a part of the ring retainer to at least a part of the support legs (in the embodiment, fibers of the rear fiber-reinforced resin layer 6 (and also the fiber-reinforced resin layer 6) may be continuous from the rod fixation portion 5a to the contacting portion 8b (over the entire length), and the fibers of the front fiber-reinforced resin layer 5 (and also the fiber-reinforced resin layer 5) may be continuous over the entire length); therefore, line guide 1 may be provided with a high strength.

Figure 8:
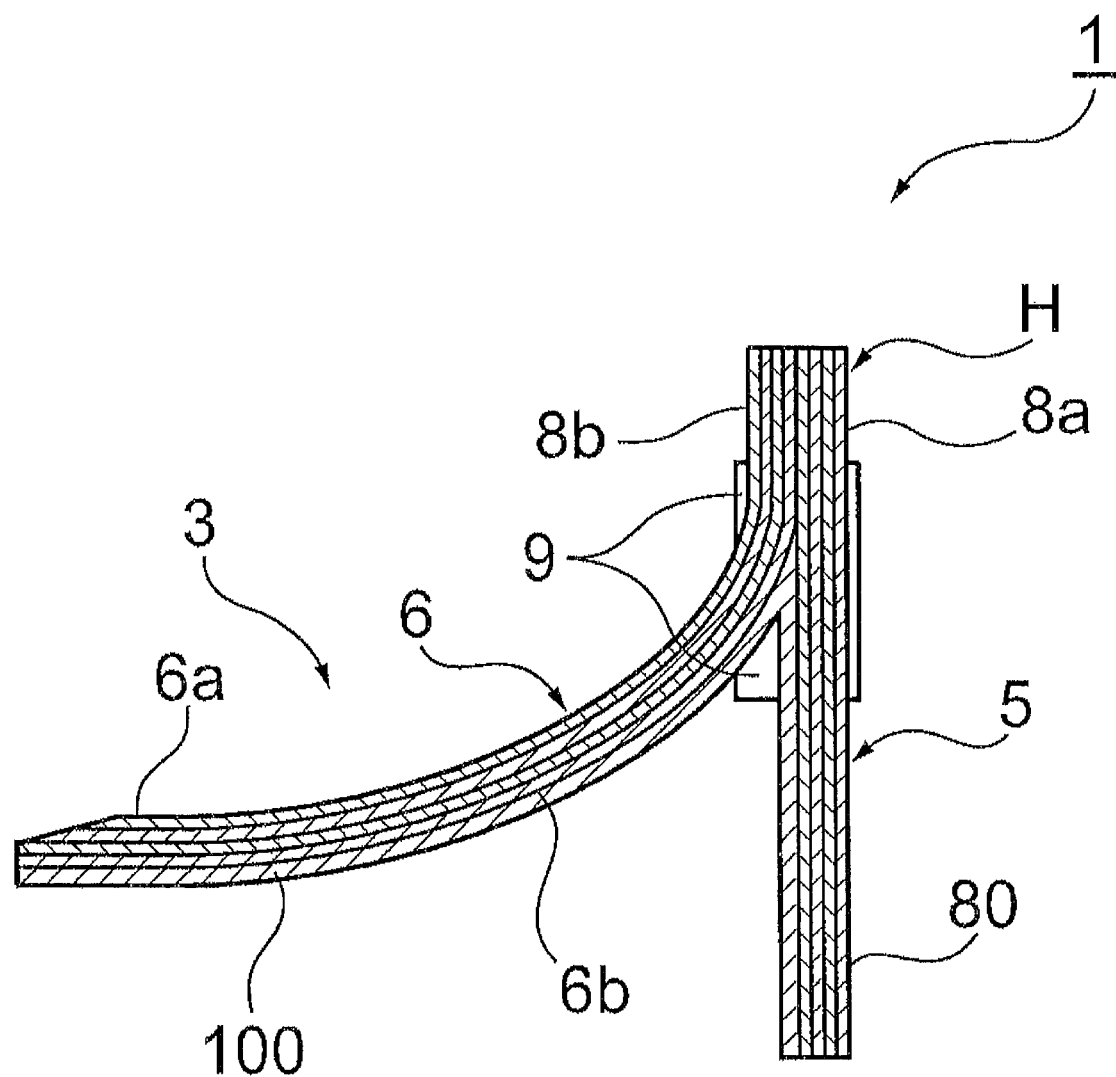
FIG. 8 is a sectional view of the fishing line guide according to a variation along the frame.
Figure 9:
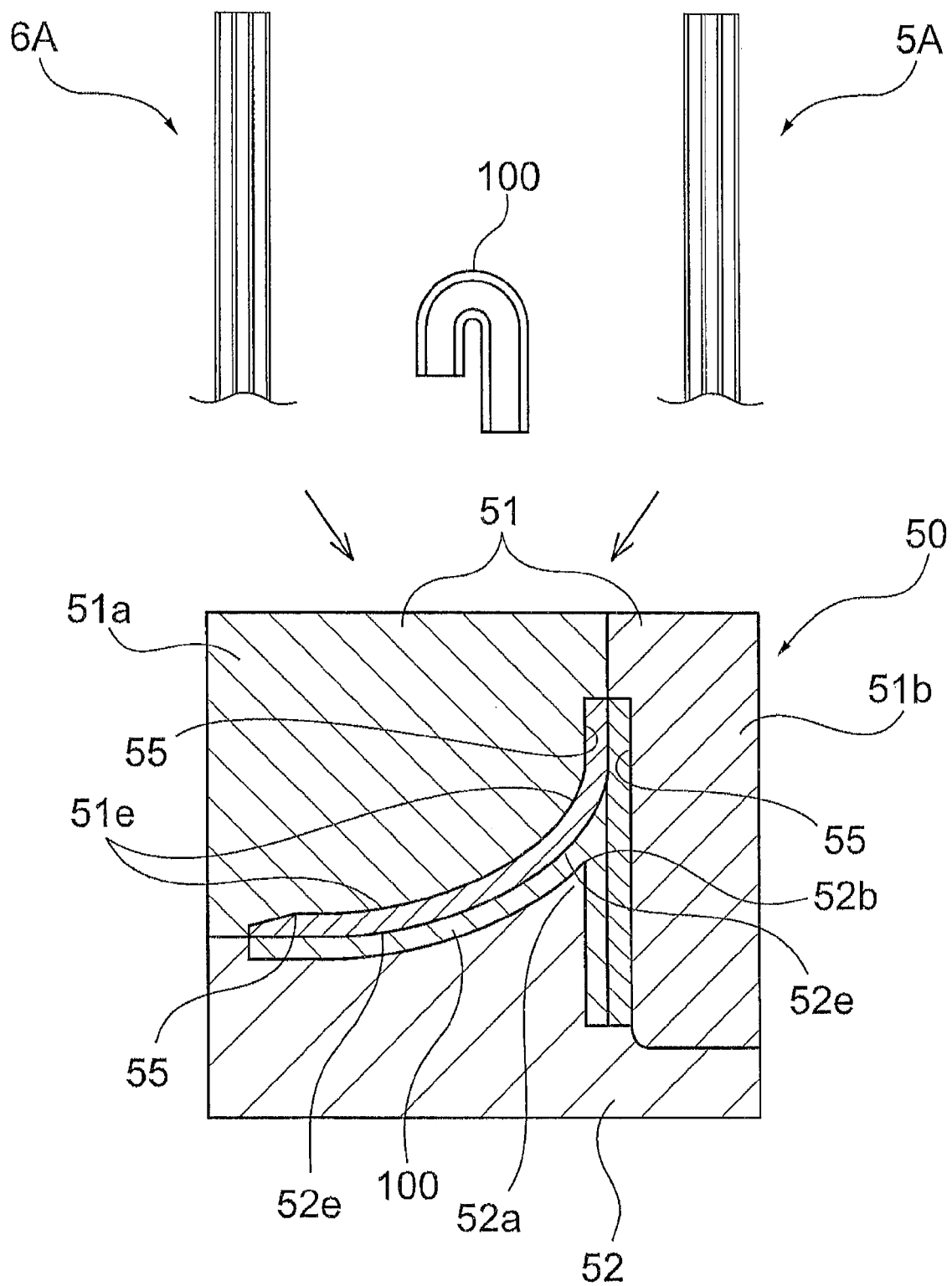
FIG. 9 is a sectional view showing an exemplary configuration of a die for forming a frame included in the fishing line guide of FIG. 8 (with laminated prepreg sheets placed therein).

FIGS. 8 and 9 show an exemplary variation of the above described embodiment. In the exemplary variation shown in FIG. 8, there is provided a reinforcement strip 100 formed of a fiber-reinforced resin layer (a fiber-reinforced resin layer formed of at least two fiber-reinforced prepregs (e.g., one is lengthwise fiber resin layer and the other is angled fiber rein layer) stacked together) disposed between and extending over the entire length of the rear fiber-reinforced resin layer 6 (including the fixation portion 6a and the support legs 6b) and the front fiber-reinforced resin layer 5 (including the contacting portion 8a (front retainer) and the rod retainer 80). The reinforcement strip 100 may be formed of fibers extending over the entire length of the reinforcement strip 100 (continuously over the entire length from the rear fiber-reinforcement resin layer 6 to the front fiber-reinforced resin layer 5). This may prevent split between the fiber-reinforced resin layers 5, 6.

Accordingly, in forming the frame 3 of the exemplary variation, when the laminated materials 5A, 6A are set in the die 50, the reinforcement strip 100 may be disposed between and over the entire length of the rear fiber-reinforced resin layer 6 and the front fiber-reinforced resin layer 5, as shown in FIG. 9.

The present disclosure is not limited to the above embodiment but is capable of various modifications within the purport thereof. For example, the shape and dimensions of the retaining hole retained and fixed at the tip end of the tip rod is not limited. Also, the frame included in the line guide may be desirably laminated and formed of desirable materials. Additionally, the form of the support legs is not limited to those in the above embodiment and may be various.

What is claimed is:

1. A fishing line guide, comprising:
a frame including a front fiber-reinforced resin layer and a rear fiber-reinforced resin layer, the front and rear fiber-reinforced resin layers respectively being formed in tabular shapes and made of reinforcement fibers impregnated with a synthetic resin,
wherein,
the front fiber-reinforced resin layer includes a first contacting portion and a retaining hole, the first contacting portion having a substantially annular shape, the retaining hole being directly fixed to a tip rod of a fishing rod,
wherein the rear fiber-reinforced resin layer includes a second contacting portion, the second contacting portion contacting the first contacting portion,
wherein the first contacting portion and the second contacting portion constitute a ring retainer retaining a guide ring for admitting a fish line;
wherein the rear fiber-reinforced resin layer includes a pair of support legs and a fixation portion, the pair of support legs extending from the second contacting portion, the fixation portion being positioned below and continuous to both the pair of support legs and further comprising a contacting surface configured for placement on a surface of the fishing rod for fixation thereto.

2. The fishing line guide of claim 1 wherein the fiber-reinforced resin layers are continuous from at least a part of the ring retainer to at least a part of each support leg.

3. The fishing line guide of claim 1 wherein each support leg is provided with a diverging portion projected from a back surface of the ring retainer.

4. The fishing line guide of claim 1 wherein a diverging portion of each support leg is projected from a back surface of the ring retainer if a left-right width of the ring retainer is at least larger than a front-rear thickness of the ring retainer, and the diverging portion of each support leg is projected from a side surface of the ring retainer if the left-right width is at least smaller than the front-rear thickness.

5. The fishing line guide of claim 1 wherein the frame is provided with at least one bending portion between the ring retainer and the support legs.

6. The fishing line guide of claim 1, wherein the reinforcement fibers of the front fiber-reinforced resin layer extends over its entire length.

7. The fishing line guide of claim 1, wherein the reinforcement fibers of the rear fiber-reinforced resin layer extends over its entire length.

8. The fishing line guide of claim 1, wherein the fixation portion is formed from diverging portions of the support legs being connected together at their ends.

9. The fishing line guide of claim 1, wherein the fixation portion comprises a flat tabular strip extending reward of the fishing line guide.

* * * * *